United States Patent [19]

Hopwell et al.

[11] Patent Number: 5,150,858
[45] Date of Patent: Sep. 29, 1992

[54] JETTISONABLE AERODYNAMIC CONTROL SURFACES

[75] Inventors: Brian L. Hopwell; Nicholas C. Dale, both of Preston; Bryan R. A. Burns, deceased, late of Treales, all of United Kingdom, by Jean H. Burns, administrator

[73] Assignee: British Aerospace Public Limited Company, London, England

[21] Appl. No.: 491,934

[22] Filed: Mar. 12, 1990

[30] Foreign Application Priority Data

Mar. 11, 1989 [GB] United Kingdom ............... 8905631

[51] Int. Cl.⁵ ............................................. B64C 39/12
[52] U.S. Cl. ................................. 244/45 A; 244/3.25; 244/1 R
[58] Field of Search ............... 244/45 A, 45 R, 3.25, 244/87, 89, 74, 1 R, 120

[56] References Cited

U.S. PATENT DOCUMENTS

| | | | |
|---|---|---|---|
| 2,656,135 | 10/1953 | Barker et al. | 244/87 |
| 2,777,655 | 1/1957 | Graham | 244/45 R |
| 2,835,199 | 5/1958 | Stanly | 244/3.25 |
| 2,924,400 | 2/1960 | Ruget | 244/45 A |
| 2,937,824 | 5/1960 | Krumbholz et al. | 244/3.25 |
| 3,141,409 | 7/1964 | Travis et al. | 244/3.25 |
| 3,310,262 | 3/1967 | Robins et al. | 244/45 R |
| 3,520,500 | 7/1970 | Mulligan | 244/87 |
| 3,642,234 | 2/1972 | Kamber et al. | 244/45 A |
| 3,680,816 | 8/1972 | Mello | 244/89 |
| 4,145,017 | 3/1979 | Stiklorus | 244/3.25 |
| 4,828,204 | 5/1989 | Friebel | 244/45 R |

FOREIGN PATENT DOCUMENTS

| | | | |
|---|---|---|---|
| 1522282 | 3/1968 | France | 244/45 A |
| 469904 | 8/1937 | United Kingdom . | |
| 514145 | 10/1939 | United Kingdom . | |
| 721530 | 1/1955 | United Kingdom . | |
| 814450 | 6/1959 | United Kingdom . | |
| 951346 | 3/1964 | United Kingdom | 244/45 A |
| 2187421 | 9/1987 | United Kingdom . | |

OTHER PUBLICATIONS

"Design Considerations of Single Stage to Orbit Reusable Launch Vehicles", *Design Engineering*, Jan., 1990, pp. 46 and 47.

*Primary Examiner*—Joseph F. Peters, Jr.
*Assistant Examiner*—Anne E. Bidwell
*Attorney, Agent, or Firm*—Young & Thompson

[57] ABSTRACT

A flight vehicle includes a fuselage 10 having a consumable fuel supply 18,12, main wings 12 each with an elevon 14 and a pair of jettisonable foreplanes 16. The foreplanes provide lift at take-off and during transonic flight and, at higher supersonic speeds they are jettisoned.

8 Claims, 3 Drawing Sheets

JETTISONABLE AERODYNAMIC CONTROL SURFACES

This invention relates to jettisonable aerodynamic control surfaces and to flight vehicles incorporating such control surfaces. In particular, though not exclusively, this invention relates to jettisonable foreplanes for recoverable, winged launch vehicles.

Examples of such launch vehicles include a single stage to orbit (SSTO) hydrogen-fuelled, recoverable, winged launch vehicle, and the first stage of a two stage to orbit (TSTO) vehicle. Such vehicles must be controllable in wing-borne flight over a very wide range of speed, extending from subsonic to hypersonic flight, with adequate allowances for manoeuvres and for countering gusts. These types of launch vehicle usually require a wide range of movements of the elevons or other pitch control surfaces because of the following inherent design features and aerodynamic characteristics.

The launch vehicles have a voluminous fuselage to enclose the large tanks necessary because of the relatively low density of liquid hydrogen fuel, and relatively small wings equipped with elevons. Although the conventional rearward (i.e. stable) shift of the aerodynamic centre occurs at transonic speed, a much larger forward (i.e. unstable) movement occurs with increasing supersonic speed into the hypersonic range due to diminishing wing lift slope and increasing dominance of fuselage lift, as illustrated in FIG. 2 of the accompanying drawings. Also, the centre of gravity shifts rearwardly on ascent because hydrogen propellant is consumed from the tanks in the front fuselage, and the dominant fixed masses (i.e. the propulsion system) of the vehicle are inevitably at the rear of the vehicle. The rearward shift of the centre of gravity reinforces the forward unstable movement of the aerodynamic centre as the Mach number increases supersonically.

As shown in FIG. 3 of the accompanying drawings, the effectiveness of the pitch control surfaces (i.e. the elevons on the wing) diminishes with increasing supersonic speed to less than 10% of their subsonic power at Mach numbers approaching 5.

The above effects combine to require large upward deflections of elevons at subsonic and transonic speeds and large downward deflections at high supersonic/hypersonic speeds. The large control deflections produce high hinge moments, requiring powerful, heavy actuators, with a consequent increase in mass, storage volume, power consumption, and expense.

We have studied the possibility of using all-moving foreplanes, potentially a more effective control at supersonic speeds, but we have found that they are impractical. This is due to the severe heating effects on re-entry because of their small leading edge radius (the heating rate varies inversely as the square root of the leading edge radius) and also to their destabilising effect. All-moving foreplanes mounted by a spigot bearing on the vehicle would require large angular travel to negate their nose-up pitching moment at high incidence on re-entry, and this would mean that, on re-entry the spigot bearing region would be exposed to full stagnation heating.

The Applicants see a need for an arrangement which allows the full range of positive and negative pitch control moments to be imparted to the flight vehicle which avoids or at least reduces the problems inherent in the existing proposals.

Broadly stated, in one aspect the invention comprises a flight vehicle including main wing means, aerodynamic control means for effecting control in at least the pitch sense of the vehicle and foreplane means for providing a lift component, said foreplane means being detachably secured to said flight vehicle.

Broadly stated, in another aspect the invention comprises a jettisonable control surface assembly for a flight vehicle, said assembly including aerodynamic control surface means, and anchorage means for being associated with said flight vehicle for supporting said aerodynamic control surface means in a predetermined orientation, and jettison means for separating said aerodynamic control surface means from said anchorage means.

The invention will now be described by way of non-limiting example, reference being made to the accompanying drawings in which:

FIG. 5 is a transverse sectional view through the jettisonable foreplane assembly illustrated in FIG. 4a.

Figure 1:
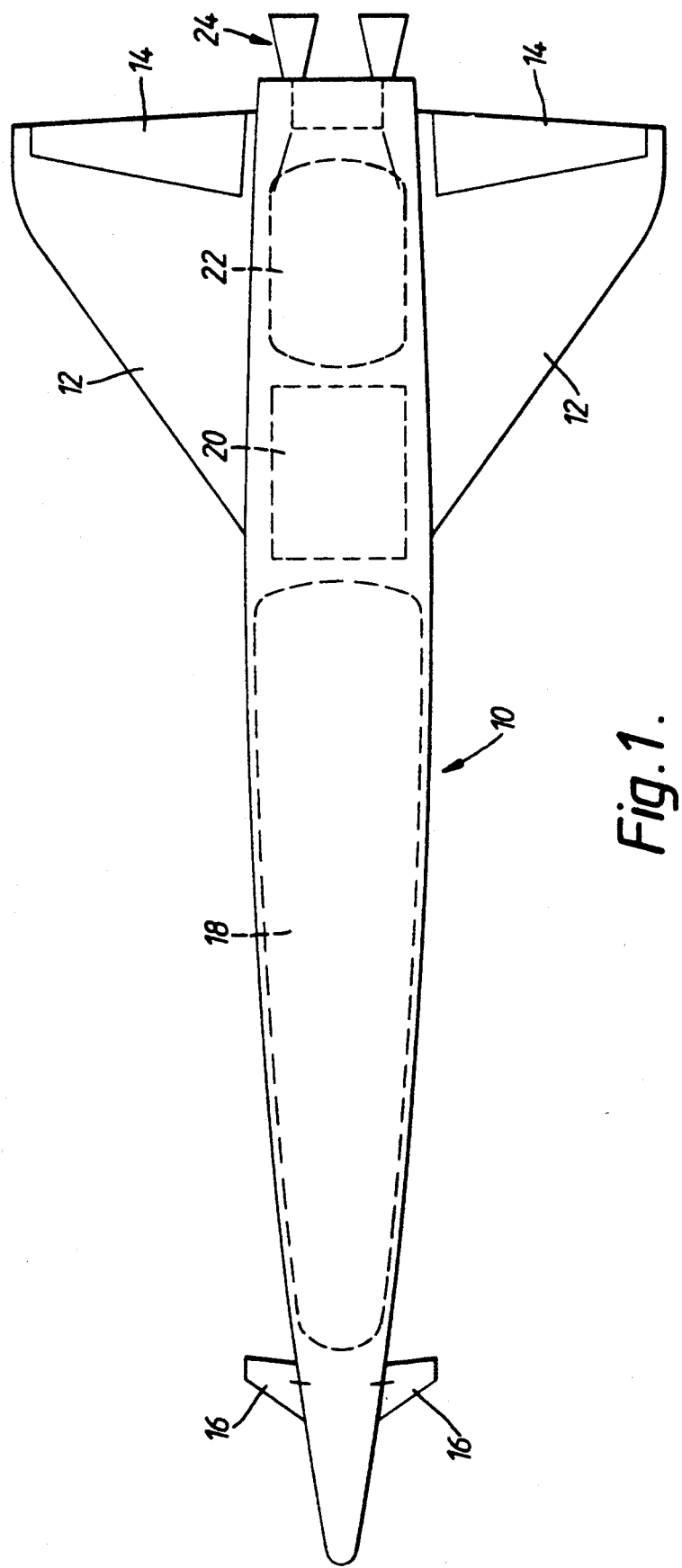
FIG. 1 is a schematic view of one example of flight vehicle fitted with jettisonable foreplanes in accordance with the invention.
Figure 2:
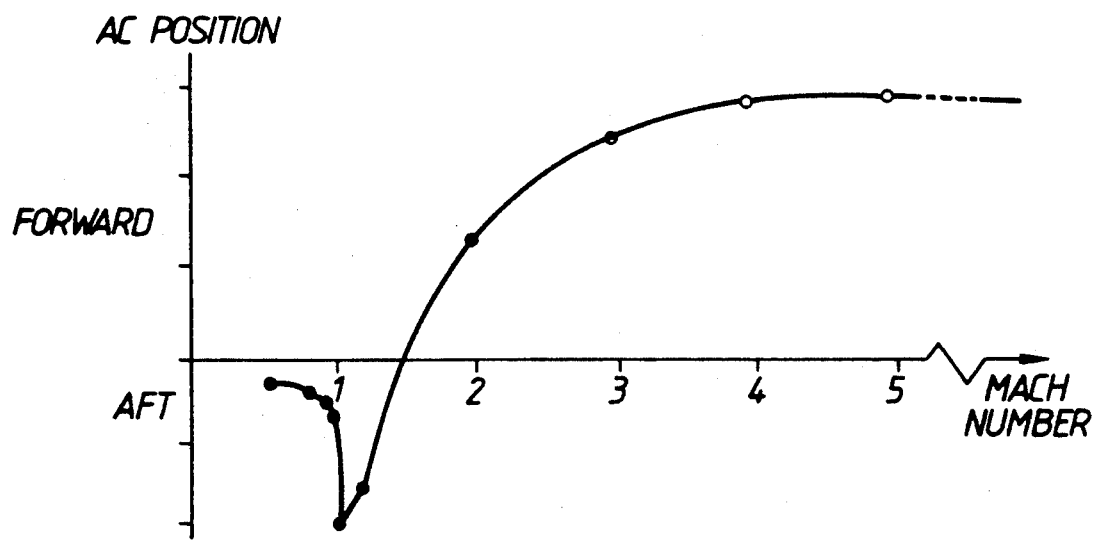
FIGS. 2 and 3 are graphs illustrating the variation with Mach number of the position of the aerodynamic centre, and the effectiveness of the pitch control surfaces respectively, for a flight vehicle of the general type shown in FIG. 1.
Figure 3:
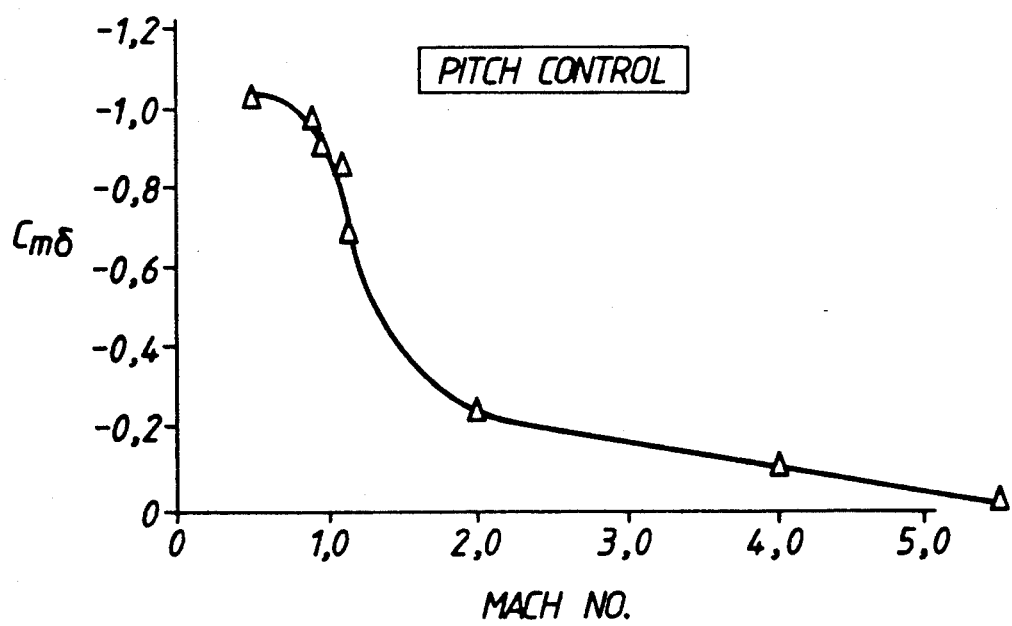

Referring to FIG. 1, the reusable flight vehicle includes a fuselage 10, main wings 12 each having an elevon 14, and a pair of jettisonable foreplanes 16 projecting laterally from a nose region of the fuselage. The fuselage 10 houses a liquid hydrogen tank 18, a payload bay 20, a liquid oxygen tank 22 and the propulsion system 24.

Figure 4A:
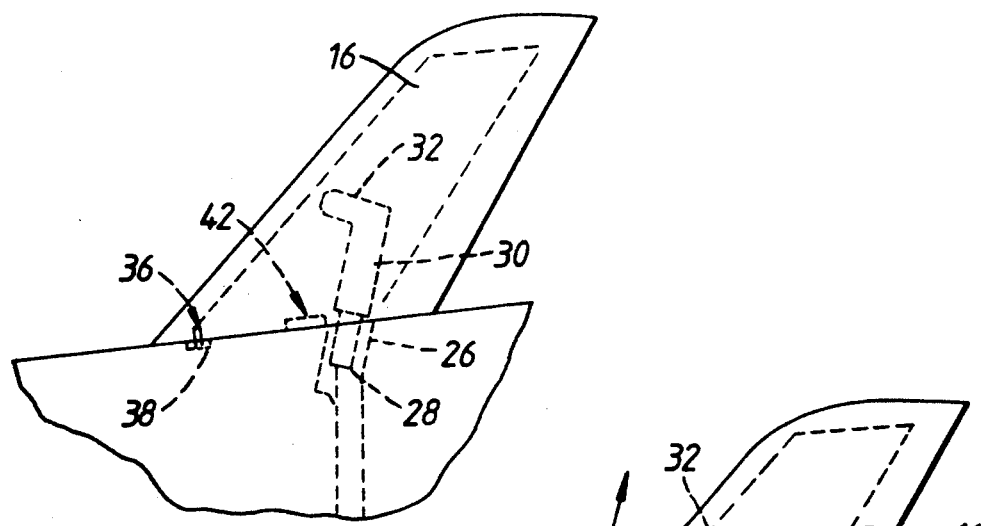
FIGS. 4a and 4b are detail plan views of one of the jettisonable foreplane assemblies of the vehicle of FIG. 1 in the installed and post-jettison positions respectively.
Figure 4B:
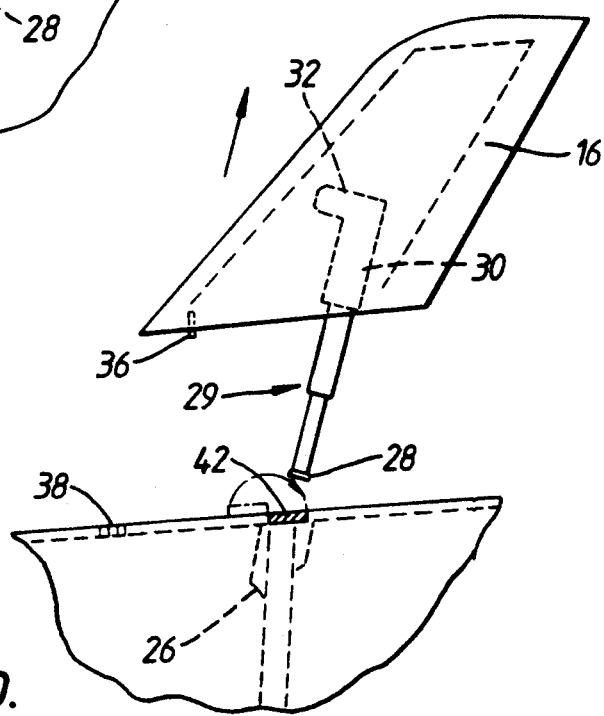
Figure 5:
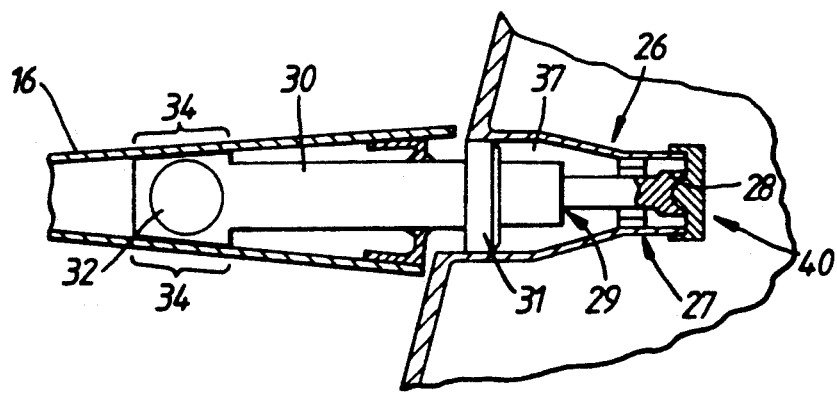

Referring now to FIGS. 4a, 4b and 5, each jettisonable foreplane assembly comprises a foreplane 16 which, when attached to the flight vehicle, is set at a fixed incidence angle, typically 0°. The foreplane 16 is releasably secured to an anchorage 26 on board the vehicle by means of a releasable spring collet arrangement 27 within the anchorage 26 which engages the free end 28 of the actuator rod 29 of a telescopic jettison gun 30. Adjacent the fuselage surface, the anchorage 26 includes a bearing 31 which slidably surrounds the exposed end of the gun 30. The body of the gun is secured to the foreplane 16 and loads are transmitted via the gun reaction region 34 shown in FIG. 5. The body of the gun forms part of the load-bearing structure (i.e. resisting bending) in the unfired condition. The actuator rod 29 is made up of telescopically movable sections and the actuator rod is moved to its fully extended position by means of a gun cartridge 32.

Forwardly of the jettison gun 30, the foreplane includes an anti-rotation spigot 36 which engages an associated recess 38 in the fuselage 10 of the flight vehicle to prevent rotation of the foreplane 16.

The anchorage 26 on the fuselage includes a housing defining a bore 32 which receives the spring collet arrangement 28 and, inboard of the arrangement 28, a reaction pad 40.

Detonation of the gun cartridge 32 extends the actuator rod 29 so that its free end disengages from the spring collet arrangement 27 and impacts the reaction pad 40. On disengagement of the free end of the actuator rod 29, the spring collet arrangement collapses to release the actuator rod so that jettisoning can occur. When the free end of the actuator rod 29 impacts the reaction pad 40, the foreplane is jettisoned laterally away from the fuselage in the direction of the arrow in FIG. 4b and the body of the gun 30 slides out of the bearing 31. A spring-loaded closing panel 42 is provided adjacent the outer end of the bore 27 and moves to close the bore when the foreplane has been jettisoned. A similar arrangement may be provided for the recess 38 associated with the anti-rotation spigot 36.

In use the foreplanes 16 will be jettisoned in a controlled manoeuvre, programmed into the flight control system of the flight vehicle, to ensure both a safe separation trajectory without the risk of collision with the vehicle structure and an acceptably small vehicle disturbance due to the sudden change in pitching moment. Firing of each jettison cartridge may be energised electrically by a pre-programmed signal from the flight control system. On firing (FIG. 4b) the explosive gases force the inner telescopic piston of the jettison gun to extend. Immediately after release, the spring-loaded closing panel 42 closes the end of the bore 27 and (if provided) a similar cover closes the spigot recess. This is primarily to prevent local cavity heating on re-entry of the vehicle into the atmosphere, from orbit.

At take-off, and during transonic flight, the foreplanes provide positive lift, augmenting lift for take-off and relieving the download on the elevons 14 in transonic flight. At higher supersonic speed, before their destabilising effect becomes detrimental, they are jettisoned.

We claim:

1. A flight vehicle including:
   main wing means,
   aerodynamic control surface means movably connected to said wing means for effecting control in at least the pitch sense of the vehicle,
   foreplane means for providing the vehicle with a lift component, and
   jettisoning means for jettisoning said foreplanes so as to cancel the lift component provided by said foreplane means.

2. A flight vehicle according to claim 1, wherein said foreplane means comprises a pair of foreplanes extending transversely one from either side of said flight vehicle.

3. A flight vehicle according to claim 2, wherein each of said foreplanes is set at a fixed incidence angle.

4. A flight vehicle according to claim 1, comprising means for propelling the flight vehicle at supersonic speeds.

5. A foreplane assembly for a flight vehicle, said assembly including:
   jettisonable aerodynamic control surface means,
   anchorage means for being associated with said flight vehicle for supporting said jettisonable aerodynamic control surface means in a predetermined orientation, and
   telescopically movable ram actuator means having one end thereof secured to said jettisonable aerodynamic control surface means and the other end thereof releasably secured to said anchorage means for separating said jettisonable aerodynamic control surface means from said anchorage means in response to a predetermined signal.

6. A jettisonable control surface assembly according to claim 5, wherein said other end of said ram actuator is releasably secured within said anchorage means by spring-biased collet means.

7. A foreplane assembly according to claim 5, further including panel means movable in use to render the surface of the flight vehicle substantially smooth and continuous following jettison of said aerodynamic control surface means.

8. A method of controlling a flight vehicle having:
   a main body portion,
   main wing means provided at an aft end region of said main body,
   jettisonable foreplane means located at a forward end region of said main body, and
   storage means for storing a consumable or jettisonable payload in the main body intermediate said foreplane means and said wing means, said storage means being positioned such that consumption or jettisoning of said payload causes a rearward shift in a centre of gravity of said flight vehicle,
   wherein during take off and an initial transonic flight phase said foreplane means provides positive lift but in a later, supersonic phase, said foreplane means is jettisoned.

* * * * *